(12) United States Patent
Cabot et al.

(10) Patent No.: US 7,200,713 B2
(45) Date of Patent: Apr. 3, 2007

(54) METHOD OF IMPLEMENTING OFF-CHIP CACHE MEMORY IN DUAL-USE SRAM MEMORY FOR NETWORK PROCESSORS

(75) Inventors: Mason B. Cabot, San Francisco, CA (US); Frank T. Hady, Portland, OR (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 10/811,608

(22) Filed: Mar. 29, 2004

(65) Prior Publication Data
US 2005/0216667 A1 Sep. 29, 2005

(51) Int. Cl.
*G06F 12/00* (2006.01)

(52) U.S. Cl. ................. 711/108; 711/148; 711/153; 711/173

(58) Field of Classification Search ............. None
See application file for complete search history.

(56) References Cited

U.S. PATENT DOCUMENTS

| | | | | |
|---|---|---|---|---|
| 6,311,212 B1* | 10/2001 | Chong et al. | ............ | 709/212 |
| 6,370,622 B1* | 4/2002 | Chiou et al. | ............ | 711/146 |
| 6,484,237 B1* | 11/2002 | Agarwala et al. | ............ | 711/122 |
| 6,535,958 B1* | 3/2003 | Fuoco et al. | ............ | 711/122 |
| 6,606,686 B1* | 8/2003 | Agarwala et al. | ............ | 711/129 |
| 6,782,463 B2* | 8/2004 | Schmisseur et al. | ............ | 711/173 |
| 7,050,191 B2* | 5/2006 | Rao | ............ | 358/1.16 |
| 7,082,502 B2* | 7/2006 | Najam et al. | ............ | 711/147 |
| 2002/0054309 A1* | 5/2002 | Rao | ............ | 358/1.9 |
| 2003/0009651 A1* | 1/2003 | Najam et al. | ............ | 712/34 |
| 2003/0056075 A1* | 3/2003 | Schmisseur et al. | ............ | 711/173 |
| 2003/0147409 A1* | 8/2003 | Wolrich et al. | ............ | 370/412 |
| 2005/0268072 A1* | 12/2005 | Najam et al. | ............ | 712/34 |

\* cited by examiner

Primary Examiner—Kevin Verbrugge
(74) Attorney, Agent, or Firm—Blakely, Sokoloff, Taylor & Zafman LLP

(57) ABSTRACT

A method, apparatus, and system for implementing off-chip cache memory in dual-use static random access memory (SRAM) memory for network processors. An off-chip SRAM memory store is partitioned into a resizable cache region and general-purpose use region (i.e., conventional SRAM use). The cache region is used to store cached data corresponding to portions of data contained in a second off-chip memory store, such as a dynamic RAM (DRAM) memory store or an alternative type of memory store, such as a Rambus DRAM (RDRAM) memory store. An on-chip cache management controller is integrated on the network processor. Various cache management schemes are disclosed, including hardware-based cache tag arrays, memory-based cache tag arrays, content-addressable memory (CAM)-based cache management, and memory address-to-cache line lookup schemes. Under one scheme, multiple network processors are enabled to access shared SRAM and shared DRAM, wherein a portion of the shared SRAM is used as a cache for the shared DRAM.

36 Claims, 6 Drawing Sheets

METHOD OF IMPLEMENTING OFF-CHIP CACHE MEMORY IN DUAL-USE SRAM MEMORY FOR NETWORK PROCESSORS

FIELD OF THE INVENTION

The field of invention relates generally to memory caching and, more specifically but not exclusively relates to techniques for employing a memory store for memory storage and caching.

BACKGROUND INFORMATION

One of the most important considerations for handling network traffic is packet throughput (i.e., bandwidth). Network processors and the like are designed to efficiently process very large numbers of packets per second. In order to process a packet, the network processor (and/or switch equipment employing the network processor) needs to extract data from the packet header indicating the destination of the packet, class of service, etc., store the payload data in memory, perform various overhead functions, etc.

In general, the foregoing packet processing operations require multiple memory accesses. As a result, packet throughput is inherently related to memory (access) latencies. Ideally, all memory accesses would be via the fastest scheme possible. For example, modern on-chip (i.e., on the processor die) static random access memory (SRAM) provides access speeds of 10 nanoseconds or less. However, this type of memory is very expensive (in terms of chip real estate and chip yield), so the amount of on-chip SRAM memory is typically very small.

The next fastest type of memory is off-chip SRAM. Since this memory is off-chip, it is slower to access. Thus, a special memory bus is required for fast access. In some designs, a dedicated back-side bus (BSB) is employed for this purpose.

Typically, off-chip dynamic RAM (DRAM) is employed for most memory work. Dynamic RAM is slower than static RAM (due to physical differences in the design and operation of DRAM and SRAM cells), and must be refreshed every few clock cycles, taking up large amounts of overhead. As before, since it is off-chip, it also requires a special bus to access it. In most of today's designs, a bus such as a front-side bus (FSB) is used to enable data transfers between banks of DRAM and a processor. Under a typical design, the FSB connects the processor to a memory control unit in a platform chipset (e.g., memory controller hub (MCH)), while the chipset is connected to the memory store, such as DRAM, RDRAM or DDR DRAM (double data rate), etc. via dedicated signals.

In general, DRAM memory accesses produce significant processing latencies relative to other processing activities. In order to address this problem, various memory-caching schemes are employed. The basic concept of the caching scheme is to cache recent memory accesses (or other data based on a pre-defined caching policy) in a smaller memory device that has faster access than larger memory device in which data is usually stored (temporal locality). Also to fetch more data than needed, data that is physically close to a needed line since that data is often needed (spatial locality).

For example, under a typical scheme, on-chip SRAM is used as a first-level cache (commonly referred to as primary or "L1" cache). This memory has an extremely low latency. Off-chip SRAM is also used for a second-level cache (commonly referred to as secondary or "L2" cache. In many designs, a processor package includes both a processor die with built-in L1 cache and a separate L2 cache (contained on a separate die).

The foregoing cache schemes are common to general-purpose processors, such as those found in a personal computer or the like. In contrast, most network processors are connected directly to SRAM and DRAM, without any cache components in-between. Some modern network processor designs include both dedicated processors for packet processing and one or more general-purpose processors. However, it is impractical to provide caches such as L1- and L2-type caches on network processors without significant impact to die constraints.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5a is a schematic diagram of a SRAM physical address space in which portions of the address space are allocated to respective threads hosted by a multi-threaded network processor, according to one embodiment of the invention;

FIG. 5b is a schematic diagram of a mapping mechanism employed for mapping threads to their corresponding address tag and data cache base addresses in accordance with the memory use scheme of FIG. 5a;

DETAILED DESCRIPTION OF PREFERRED EMBODIMENTS

Embodiments of methods, apparatus, and systems for implementing off-chip cache memory in dual-use SRAM memory are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the invention described below address the memory access requirements for network processors (NPs) including general-purpose (GP) processors in a manner that supports caching for GP memory accesses (and/or other processor memory accesses) without requiring a dedicated on-chip or off-chip cache. In accordance with one aspect, the embodiments allow for the connection of a network processor to a general-purpose processor memory connection (i.e., processor bus such as FSB) by using the NP's existing SRAM as a cache array. This SRAM is therefore simultaneously used for two completely different purposes: (1) as a directly accessed, low-latency memory store (i.e., it original purpose under a conventional NP design); and 2) as a low-latency memory cache array that accesses DRAM data belonging to the DRAM shared with the GP processor.

The embodiments capitalize on the high degree of integration between processing engines and memory interfaces on network processors. SRAM is typically the fastest off-chip memory, so in some embodiments SRAM is employed as a cache memory array to hold cached data. The other fundamental component of a cache—the cache controller state machines and the cache tag array—can be directly integrated on the network processor.

Partitioning along these lines allows for rapid cache management and tag lookups while using the already integrated SRAM memory controller and off-chip SRAM to store the cached data. This enables efficient participation in a coherent general-purpose processor bus protocol as the snoop phase (i.e., tag lookup) will complete rapidly.

Figure 1:
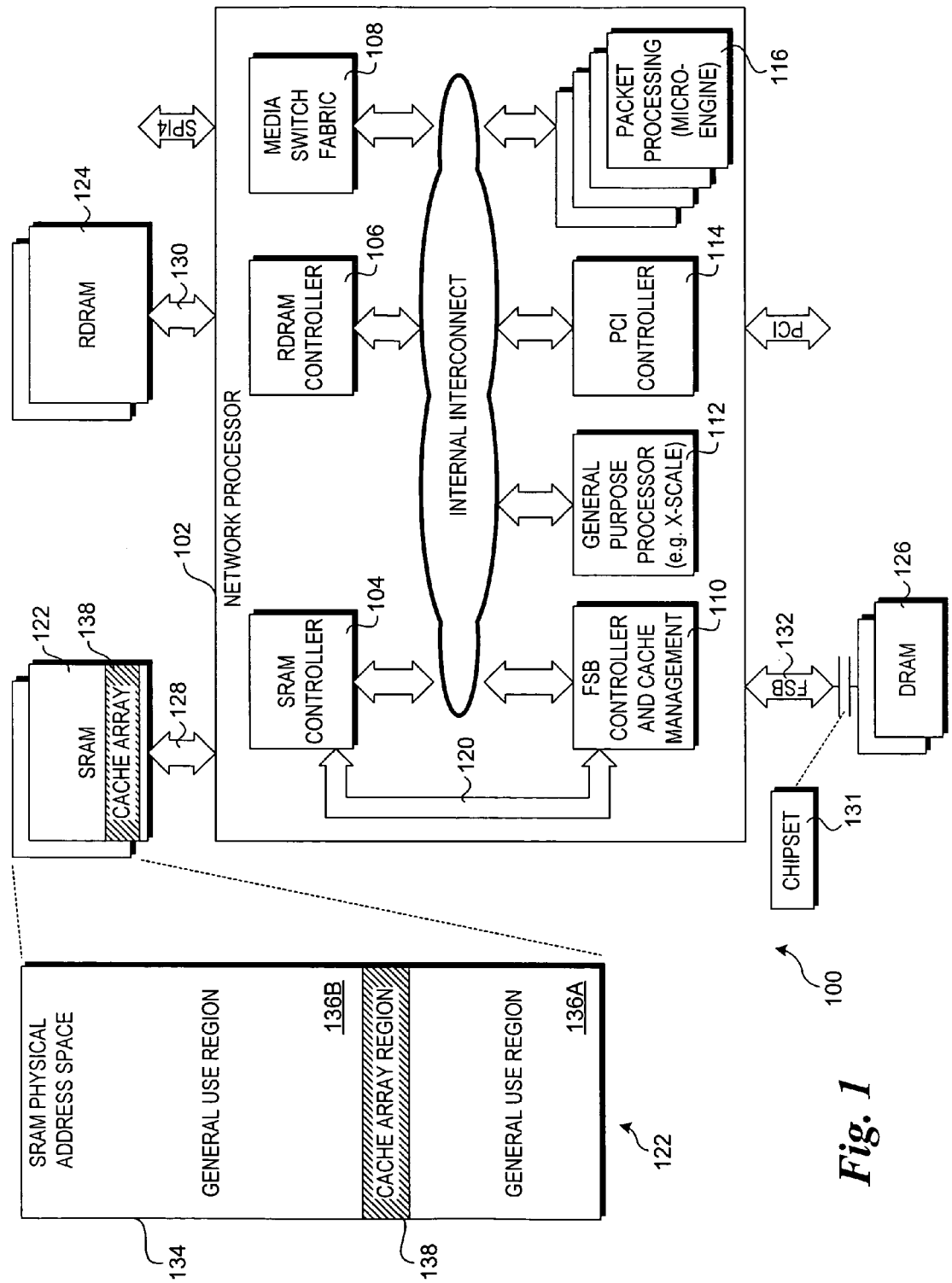
FIG. 1 is a schematic diagram of a network processor system architecture for supporting concurrent use of an off-chip SRAM memory store as both a cache for a second off-chip memory store and general-purpose use of the SRAM memory store, according to one embodiment of the invention.

FIG. 1 shows a network processor system architecture 100 that supports the foregoing aspects of dual-use SRAM, according to one embodiment of the invention. At the heart of the architecture is a network processor 102. The network processor includes an SRAM controller 104, a Rambus DRAM (RDRAM) controller 106, media switch fabric 108, an integrated FSB controller and cache management component 110, a general-purpose processor 112, a peripheral component interconnect (PCI) controller 114, and a plurality of packet processing micro-engines 116. Each of the foregoing components are interconnected via an internal interconnect 118, which represents an appropriate set of address and data buses and control lines to support communication between the components. In one embodiment, a private channel 120 supports enhanced communication between SRAM controller 104 and FSB controller and cache management component 110. In another embodiment, a combination of private channel 120 and internal interconnect 118 is used to support communication between SRAM controller 104 and FSB controller and cache management component 110.

Network processor system architecture 100 depicts several memory stores. These include one or more banks of SRAM 122, one or more banks of RDRAM 124, and one or more banks of DRAM 126. In one embodiment, SRAM 122 is connected to network processor 102 (and internally to SRAM controller 104) via a high-speed SRAM interface 128. In one embodiment, RDRAM 124 is connected to network processor 102 (and internally to RDRAM controller 106) via a high-speed RDRAM interface 130. In one embodiment, DRAM 126 is connected to a chipset 131, which, in turn, is connected to network processor 102 (and internally to FSB controller and cache management component 110) via a front-side bus 132 and FSB interface.

As depicted herein, RDRAM-related components are illustrative of various components used to support different types of DRAM-based memory stores. These include, but are not limited to RDRAM, RLDRAM (reduced latency DRAM), DDR, DDR-2, DDR-3, and FCDRAM (fast cycle DRAM).

Further details of the partitioning of the physical address space of SRAM 122, according to one embodiment, is shown toward the left-hand side of FIG. 1. The one or more banks of SRAM are logically configured as an SRAM physical address space 134 spanning a base address to a top address, which will generally be equal to the base address plus the size of the address space. The particular base address value is unimportant. As depicted in FIG. 1, the SRAM physical address space is divided into two different types of regions, including general use regions 136A and 136B and a cache array region 138.

Overall, the general use regions 136A and 136B are used in the same manner as conventional SRAM usage as pertains to network processor operation. That is, the general use regions function as "normal" SRAM, and may be used to store various data based on the needs of the network processor. From the perspective of SRAM controller 104, the entire SRAM physical address space 134 appears contiguous, and it treats the general use regions and cache array region 138 the same.

In contrast to the general use regions, cache array region 138 is used to serve as an SRAM cache for general-purpose processor 112 and/or other processing elements. This provides an operable cache for the GP processor without requiring a separate physical cache (i.e., separate off-chip cache), bus, and chipset, as would exist with a conventional cache implementation. Furthermore, under one embodiment the size of the general use and cache array regions may be changed dynamically. Additionally, the address space allocated to the cache array regions need not be contiguous, adding flexibility to the caching scheme.

Figure 2:
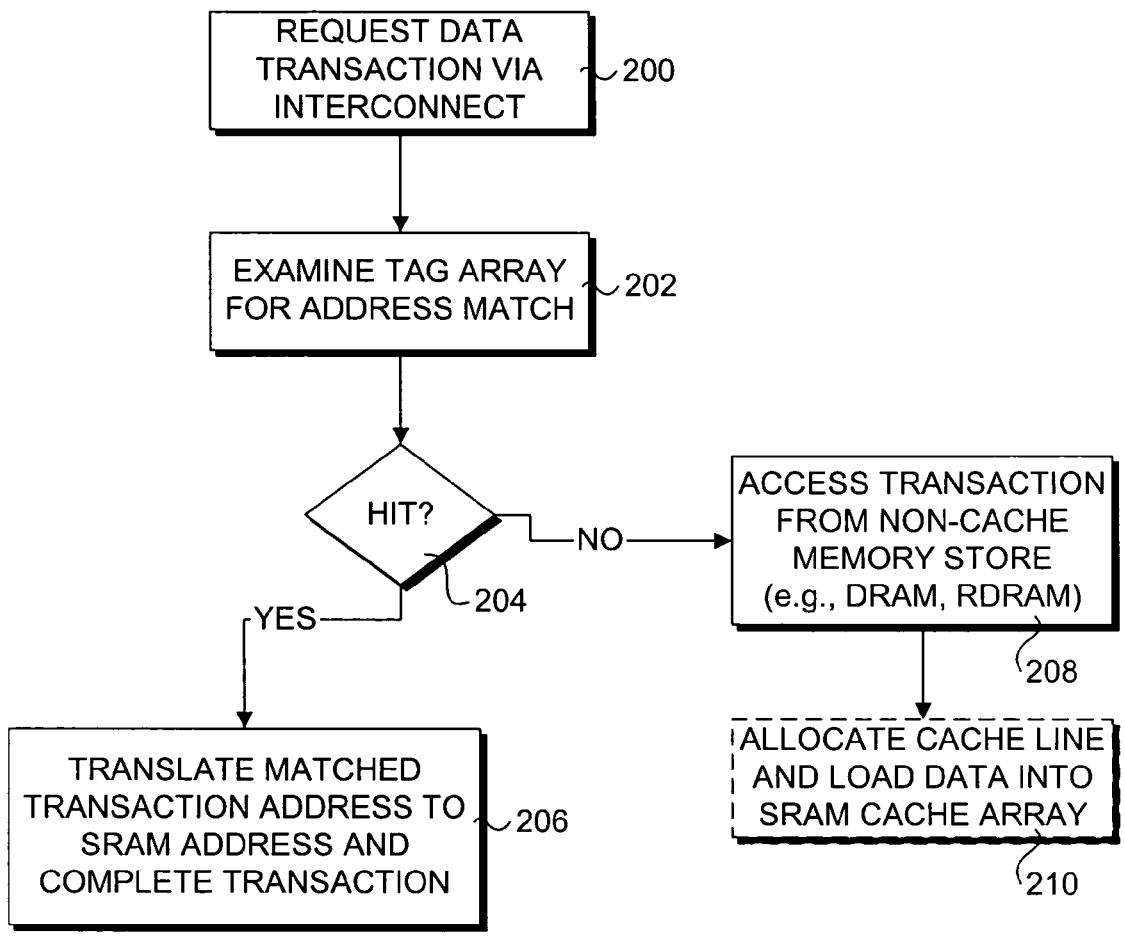
FIG. 2 is a flowchart illustrating operations and logic performed during processing of a data transaction implemented with the architecture of FIG. 1, according to one embodiment of the invention.

FIG. 2 shows operations and logic performed in response to a transaction request using NP system architecture 100, according to one embodiment. The process begins in a block 200, wherein a data transaction is requested via internal interconnect 118. The data transaction request will generally be a read or write request to a portion of physical or virtual memory space. For example, software or firmware running on general-purpose processor 112 may map the memory banks occupied by DRAM 126 to a physical address space having a pre-defined address range. Likewise, banks of RDRAM 124 may be mapped to pre-defined address ranges. Internally, GP processor 112 may employ a physical addressing scheme, a virtual address scheme, or both. Additionally, software running on GP processor 112 (e.g., an operating system kernel) may employ its own virtual address scheme.

At some point during transaction processing, all memory accesses will reference a physical address. If virtual addressing is employed, a virtual-to-physical address translation will be automatically performed by either a hardware component or a software component, depending on the particular architecture design choice. For example, virtual-to-physical address translation may be performed by GP processor 112, FSB controller and cache management component 110, RDRAM controller 106, or software running on GP processor 112.

For clarity, it will be assumed for the present example that any initial virtual-to-physical address translations are handled by GP processor 112 (or software running thereon). Thus, the data transaction request will reference a particular physical starting address and optional length or physical address range.

The data transaction request is transmitted via internal interconnect to FSB controller and cache management component 110. This component performs cache management functions, in addition to supporting communications with devices connected to FSB 132. In particular, FSB controller and cache management component 110 manages the use of and access to cache array region 138, which comprises a type of "virtual" cache with respect to the fact that its size and location within SRAM physical address space 134 is not fixed. In one respect, the FSB controller and cache management component 110 comprises a hardware-based cache management solution that provides a level of flexibility that would be more commonly associated with a software solution while provided the enhanced performance of hardware-based processing.

One of the primary functions of FSB controller and cache management component 110 is cache lookup and address translation. As will be recognized by those skilled in the art, this functionality is facilitated by a cache tag array. Cache tag arrays provide a fast mechanism for: 1) determining whether an address or address range corresponding to a transaction request presently exists in a cache; and 2) performing an address translation between the physical address (or range) referenced in the request and the virtual address (i.e., physical address in SRAM physical address space 134) of the corresponding cache line or lines. In general, one of various well-known cache tag array schemes may be employed; the particular cache tag array scheme to be implemented is a design choice left to the network processor designer.

Returning to the flowchart of FIG. 2, in response to receiving a data transaction request, FSB controller and cache management component 110 examines its tag array to determine whether there is an address match, as depicted by a block 202. In general, the internal mechanism for determining whether an address match exists will depend on the architecture of the cache tag array that is implemented. For example, a hash-based cache tag array is employed in one embodiment.

In a decision block 204, a determination to whether a cache hit results or not is made. If there is an address match in the cache tag array, a cache hit results, causing the logic to proceed to a block 206. More specifically, a cache hit means the address (or address range) specified by the data transaction is already present in the cache. Accordingly, in block 206 the matched transaction address is translated (based on the cache tag architecture) to its corresponding physical address in SRAM 122 (more specifically in the cache array region 138) and the transaction is completed in a manner analogous to that used for a data transaction that is serviced by a conventional cache. For example, for a data read transaction the data is read from one or more cache lines in cache array region 138 (via control operations performed by SRAM controller 104) and returned to the transaction requestor (e.g., general-purpose processor 112) via internal interconnect 118.

Generally, there are two schemes that may be employed for write transactions. Typically, a write transaction will correspond to saving new data at a new location (in the physical address space corresponding to a destination memory device), or overwriting existing data at an existing location with new data. As such, it may or may not be advantageous to cache write transactions, depending on the particular work that is being done. For example, if data corresponding to the same objects are continuously being updated, it may be advantageous to cache write transactions as well as read transactions.

Accordingly, in one embodiment, write transactions are written to cache array region 138 and then copied to the destination memory space (e.g., DRAM 126 or RDRAM 124 for the current example). In another embodiment, cache and memory writes are performed via (substantially) concurrent operations. In yet another embodiment, the cache is bypassed, and the data are directly written to the destination memory device. In one embodiment, FSB controller and cache management component 110 include a plurality of posted write buffers (not shown), wherein temporary data writes are written to the posted write buffers, and the actual data writes to DRAM 126 via the frontside bus 132 are performed asynchronously when the FSB is clear by copying data in the posted write buffers to appropriate DRAM memory addresses.

Returning to decision block 204, if an address match is not found in the cache tag array, a cache miss results, indicating the data are not present in the cache. Thus, the data must be accessed from its storage location in memory (e.g., DRAM 126), as depicted by block 218. In a manner analogous to the aforementioned write transaction, FSB controller and cache management component 110 may include a plurality of posted read buffers, enabling read request via FSB 132 to be performed asynchronously from corresponding data forwarding operations via internal interconnect 118 used to forward the read data to the read transaction requester.

In an optional operation shown in block 210, data corresponding to a read request may be cached in cache array region 138. This comprises allocating one or more cache lines via FSB controller and cache management component 110 and loading the data into corresponding cache lines in cache array region 138. Generally, the data may be directly copied from the memory store (e.g., DRAM 126 or RDRAM 124), or may be first written to a posted read buffer and subsequently copied to the cache array region.

Most memory devices, such as DRAM 126, SRAM 128 and RDRAM 124, store and retrieve data by addressing specific memory locations. As a result, this path often becomes the limiting factor for systems that rely on fast memory access. The time required to find an item stored in memory can be reduced considerably if the stored data item can be identified for access by the content of the data itself rather than by its address. Memory that is accessed in this way is called content-addressable memory (CAM). CAM provides a performance advantage over other memory search algorithms (such as binary and tree-based searches or look-aside tag buffers) by comparing the desired information against a list of pre-stored entries simultaneously, often resulting in an order-of-magnitude reduction of search time. CAM is ideally suited for several functions, including Ethernet address lookup, data compression, pattern-recognition, cache tags, high-bandwidth address filtering, and fast lookup of routing, high-bandwidth address filtering, user privilege, security, or encryption information on a packet-by-packet basis for high-performance data switches, firewalls, bridges, and routers.

Figure 3:
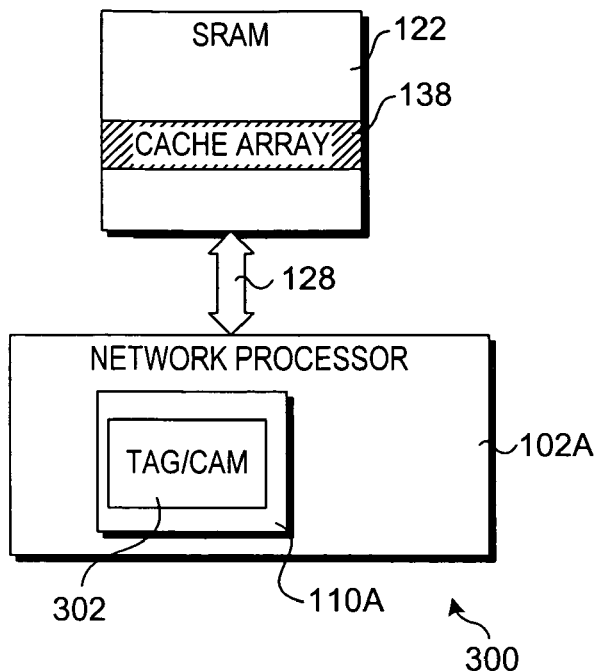
FIG. 3 is a schematic diagram of a cache management scheme employing a hardware-based tag array and content addressable memory (CAM) component; according to one embodiment of the invention.

In view of the foregoing, embodiments may include a cache that may be implemented using a hardware- or software-based CAM component. For example, FIG. 3 shows a network processor system architecture 300 including a network processor 102A in which a TAG/CAM component 302 is implemented in an FSB controller and cache management component 110A. For the purpose of clarity, the various other components of network processor 102A (e.g., SRAM controller 104, RDRAM controller 106, etc.) are removed in NP system architecture 300. It will be understood that these or similar components are included in one embodiment of network processor 102A.

The CAM component may be integrated into an existing component (i.e., network processor 102A, or may be implemented via a separate off-chip component. Generally, hardware-based CAM functionality may be provided via appropriate logic "programmed" into the integrated circuit design; these designs employ "embedded" CAM functionality. Techniques for design and fabrication of embedded CAMs are well-known in the memory arts. Accordingly, the specific details of the designs used for a particular implementation, such as the depth and width of the CAM, is an engineering design choice.

Figure 4:
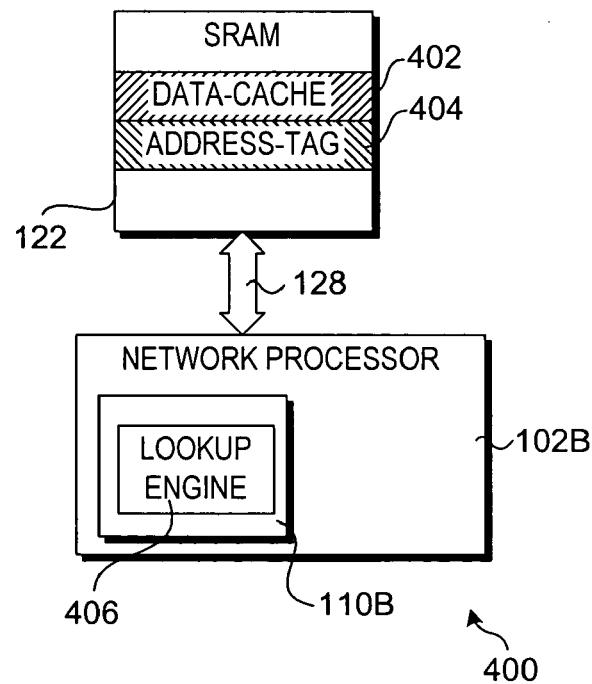
FIG. 4 is a schematic diagram of a cache management scheme employing a memory-based tag array stored in an SRAM memory store and a hardware based lookup engine integrated on a network processor, according to one embodiment of the invention.

In accordance with another aspect of some embodiments, information corresponding to the cache tag array functionality is moved to the SRAM store itself. For example, FIG. 4 shows in NP system architecture 400 in which SRAM 122 is used to host both a resizable data cache 402 and a resizable address tag array 404. In general, address tag array 404 contains information that is analogous to information contained in a typical cache tag array. However, in this instance, the tag array is implemented via a portion of memory (i.e., a portion of SRAM physical address space 134) rather than via hardware facilities.

In order to access the address tag array 404, a mechanism is employed to performs a "lookup" of the tag array in a manner analogous to the operation performed in block 202 discussed above. In one embodiment, this lookup mechanism is performed by a lookup engine 406 embedded in an FSB controller 110B, which in turn is a functional block in a network processor 102B. As before, further details of network processor 102B are not depicted for clarity, but will be understood to exist in an actual embodiment. In one embodiment, the lookup engine is implemented via a set of state machine equations. Further details of how lookup engine 406 operates are described below.

As discussed above, in the embodiment illustrated in FIG. 1 network processor 102 includes a plurality of packet-processing microengines 116. This is typical of modern network processor architectures. Having multiple microengines enables packet processing to be performed in parallel. The architecture also enables individual microengines to share the same memory resources.

Under typical operations, each microengine 116 will perform processing operations corresponding to a respective "thread." In turn, each thread will have a thread context that is maintained by the microengine hosting the thread. In some embodiments, a microengine may provide support for hardware-based multi-threading, enabling each microengine to simultaneously host multiple threads.

Figures 5A, 5B:
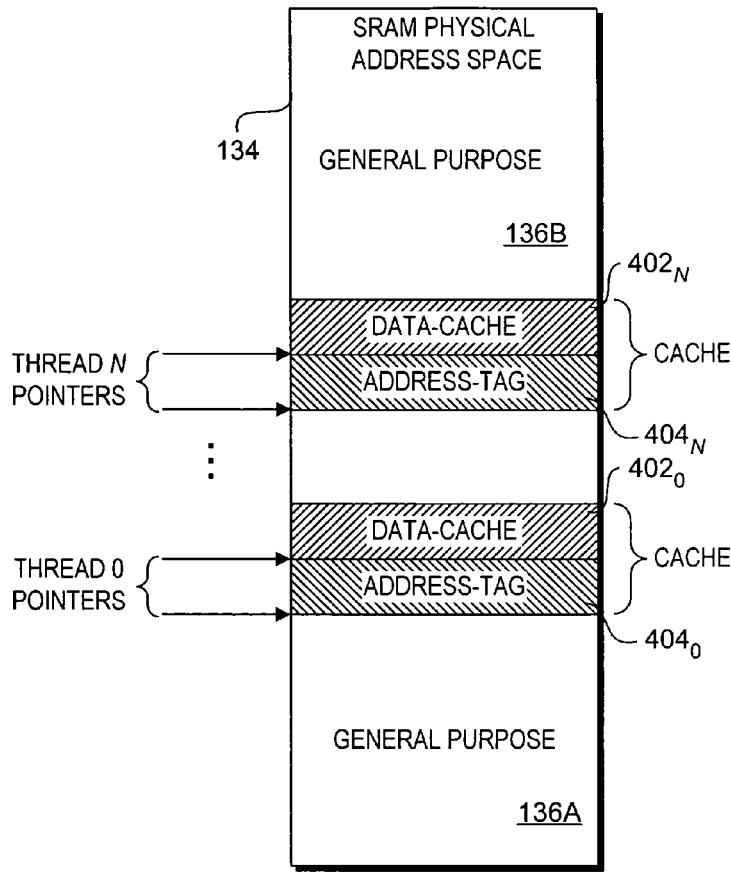

One scheme to support multiple threads according to one embodiment of the invention is shown in FIGS. 5a and 5b. In this instance, respective portions of SRAM physical address space 134 are allocated for use as cache memory for respective threads. The portions of the SRAM physical address space may be contiguous or may be non-contiguous. In the illustrated embodiment, each cache portion includes a data cache $402_N$ and an address-tag array $404_N$, wherein the subscript N stands for the respective thread identifier, beginning with thread 0.

A mapping mechanism 500 is employed for mapping each thread to its corresponding cache components. In one embodiment, the mapping mechanism contains a pair of pointers for each thread's set of cache entries, including 1) a pointer to the base address of the address tag array $404_N$ for the thread; and 2) a pointer to the base address of the data cache $402_N$ for the thread. In one embodiment, mapping mechanism 500 comprises data that is stored in FSB controller and cache management component 110B that is accessed and/or manipulated by lookup engine 406. In another embodiment (not shown), the data in mapping mechanism 500 may be stored in a portion of SRAM physical address space 134.

In addition to supporting multiple threads from various network processors, embodiments of the invention may be implemented to share common dual-use memory spaces among multiple network processors. For instance, architecture 600 shows a shared cache scheme in which a plurality of network processors $102_{0-7}$ share memory resources, including SRAM 122, and DRAM 126. To support this sharing, each of network processors $102_{0-7}$ is coupled to SDRAM interface 128, and FSB 132.

Figure 6:
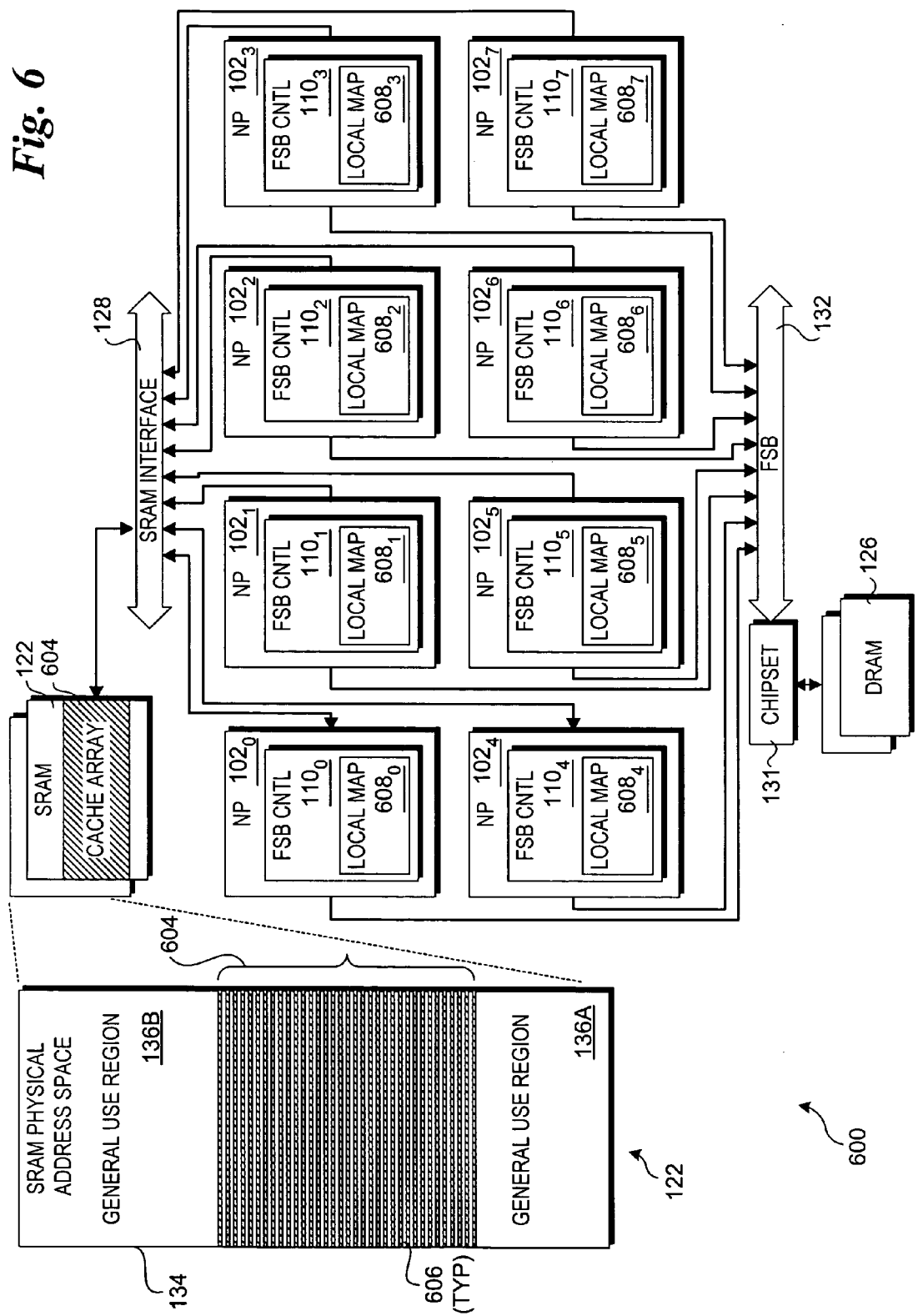
FIG. 6 is a schematic diagram of a system architecture in which a plurality of network processors share common SRAM, DRAM, and RDRAM memory stores, and a portion of the SRAM memory store is used for a cache for the DRAM and/or RDRAM memory stores, according to one embodiment of the invention.

Under the embodiment of FIG. 6, a portion of SRAM 122 is allocated as a cache array 604 including a plurality of cache lines 606. In the illustrated embodiment, cache array 604 occupies a single contiguous portion of SRAM physical address space 134. However, this is merely illustrative of one embodiment, as the SRAM physical address space may also be partitioned to support multiple non-contiguous cache arrays. Each cache array includes a plurality of cache lines 606 in which cached data are stored in the conventional manner.

To support the shared cache scheme, each of network processors $102_{0-7}$ includes a respective FSB controller and cache management component $110_{0-7}$ having a local address-to-cache line map $608_{0-7}$. Each local address-to-cache line map 600 contains a list of cache lines currently "owned" (i.e., used) by its corresponding network processor 102. In general, the local address-to-cache line map may also include information concerning the portion of cache array 604 allocated to its network processor. In one embodiment, all network processors are enabled to access a common cache array address space or spaces.

Figure 7:
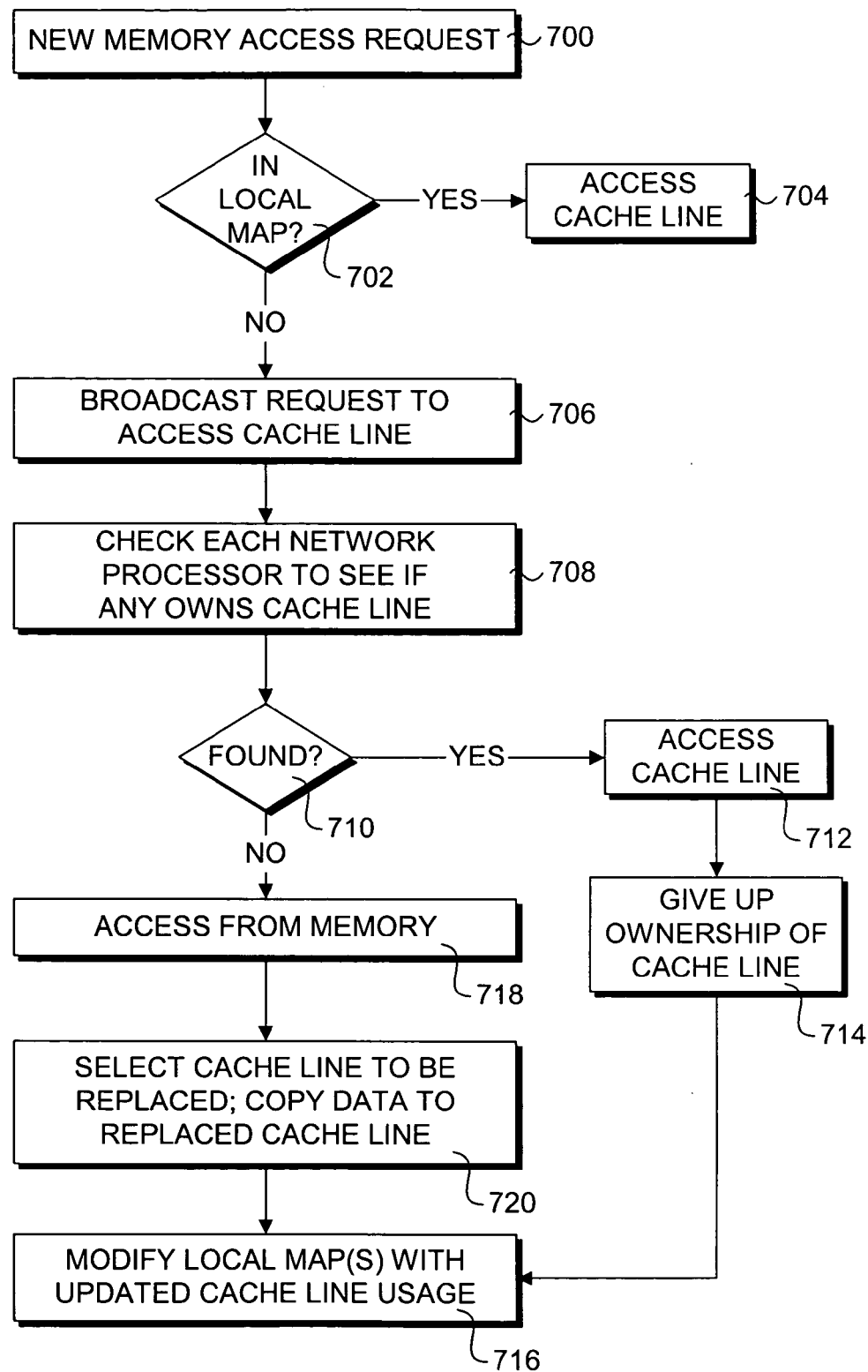
FIG. 7 is a flowchart illustrating operations and logic performed during a memory access implemented using the system architecture of FIG. 6, according to one embodiment of the invention.

FIG. 7 shows a flowchart illustrating operations performed in accordance with one embodiment of the shared cache scheme of FIG. 6. The process starts with a new memory access request from a requesting network processor in a block 700. In a decision block 702 a determination is made to whether there is an existing cache line entry corresponding to the access request address already in the local address-to-cache line map for the requesting NP. If so, the cache line is accessed to perform the memory access request, as depicted by a block 704.

If there is not a matching local map entry, an access to the cache line is broadcast to the other network processors in a block 706. In response to the request, each network processor checks to see if it owns the cache line. If one of the network processors has a cache line entry corresponding to the memory request address in its local address-to-cache line map, the appropriate cache line is found, as depicted by a decision block 710. In the event the cache line is found, that cache line is accessed in cache array 604 in a block 712 to service the memory access request. In one embodiment, the current owner of the cache line (i.e., the NP having the cache line entry in its local address-to-cache line map) gives up ownership of the cache line, as depicted by a block 714. The local address-to-cache line maps of the NP that was the previous owner and the requesting NP are then modified in a block 716 to reflect the updated cache line ownership configuration. As such, the requesting NP now owns the cache line, and there is a corresponding entry in its local address-to-cache line map.

Returning to decision block 710, if none of the NP's have an appropriate cache entry in their local address-to-cache line maps, the answer to decision block 710 is NO, and the memory access request is serviced by accessing the shared memory store in which data corresponding to the request is stored, such as DRAM 126, in a block 718. In one embodiment, a cache line is then selected to be replaced and the data that is retrieved is copied to a replacement cache line in a block 720.

In general, various types of cache replacement policies may be used, as are well-known in the art. For example, a least recently used policy may be employed, wherein the cache line that has been least recently used is replaced. In one embodiment, the replacement cache line will be one of the cache lines owned by the requesting NP, such as the least recently used cache line from among the cache lines in its local address-to-cache line map. In another embodiment, a global cache use mechanism is employed, wherein the least recently used cache line may include any of the cache lines in the cache array. For example, cache usage information could be included in a separate portion of SRAM physical address space 134 (not shown), or could be added as part of a cache line.

After the replacement cache line has been identified and filled with the copied data, modifications to the local address-to-cache line map(s) of the NP(s) involved in the ownership of the replaced cache line are made to reflect the updated cache configuration in block 716.

In general, the functional components of the network processor embodiments described above will be implemented as integrated circuits formed on a semiconductor chip. In addition, embodiments of the present description may be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
enabling a plurality of network processors to access a first shared memory store and a second shared memory store; and
employing a portion of the first shared memory store as a memory cache for the second shared memory store;
each network processor having a cache management component retrieving data from the memory cache, and a content addressable memory component performing content based searches of the first and second shared memory stores.

2. The method of claim 1, wherein the first shared memory store and the second shared memory store are selected from a group of shared memory stores consisting of dynamic random access memory (DRAM), Rambus dynamic random access memory (RDRAM), static random access memory (SRAM), reduced latency dynamic random access memory (RLDRAM), double data rate dynamic random access memory (DDR DRAM), double data rate two dynamic random access memory (DDR-2), double data rate three dynamic random access memory (DDR-3), and fast cycle dynamic random access memory (FCDRAM).

3. The method of claim 1, further comprising:
configuring the memory cache as a cache array including a plurality of cache lines; and
maintaining a local address-to-cache line map in the cache management component of each network processor in which cache lines associated with the respective network processor are mapped to corresponding memory addresses in an address space for the second shared memory store.

4. The method of claim 3, further comprising:
broadcasting a cache line access request to the plurality of network processors in response to a memory access request from a requesting network processor; and
performing a cache line lookup in the local address-to-cache line map of each network processor to determine which, if any, network processors own a cache line of the plurality of cache lines corresponding to the memory access request.

5. The method of claim 4, further comprising:
accessing the cache line to service the memory access request if it is determined that one of the network processors own the cache line; and
releasing ownership of the cache line by updating the local address-to-cache line map for the network processor that owned the cache line and assigning ownership of the cache line by updating the local address-to-cache line map for the requesting network processor.

6. The method of claim 4, further comprising:
retrieving data from the second shared memory store if it is determined that none of the network processors own the cache line;

selecting a cache line in the memory cache to replace;
copying data from the second shared memory store into the cache line selected for replacement; and
updating the local address-to-cache line map of the requesting network processor to assign ownership of the replaced cache line to the requesting network processor.

7. A computing apparatus comprising:
an internal interconnect;
a first memory store, coupled with the internal interconnect via a first memory controller;
a second memory store, coupled with the internal interconnect via a second memory controller;
a cache management component coupled with the internal interconnect to effectuate a memory cache in a portion of the first memory store corresponding to data in the second memory store; and
a content addressable memory component to perform content based searching of the first and second memory stores.

8. The computing apparatus of claim 7 wherein the first and second memory stores are selected from a group of memory stores consisting of dynamic random access memory (DRAM), Rambus dynamic random access memory (RDRAM), static random access memory (SRAM), reduced latency dynamic random access memory (RLDRAM), double data rate dynamic random access memory (DDR DRAM), double data rate two dynamic random access memory (DDR-2), double data rate three dynamic random access memory (DDR-3), and fast cycle dynamic random access memory (FCDRAM).

9. The computing apparatus of claim 7, wherein the first memory store comprises a static random access memory store and the second memory store comprises a Rambus dynamic random access memory store.

10. The computing apparatus of claim 7, wherein the content addressable memory component is implemented in software or firmware.

11. The computing apparatus of claim 7, wherein the content addressable memory component is implemented in hardware.

12. The computing apparatus of claim 7, wherein the content addressable memory component is integrated with the cache management component in hardware.

13. The computing apparatus of claim 7, wherein first memory store comprises a static random access memory store integrated onto the network processor.

14. The computing apparatus of claim 7, wherein the first memory store further comprises:
a plurality of non-contiguous memory cache regions; and
a plurality of non-contiguous general use regions.

15. The computing apparatus of claim 7, wherein the cache management component is configured to maintain a hardware-based cache tag array.

16. The computing apparatus of claim 7, wherein the cache management component further comprises:
a first computer instruction to support concurrent execution of a plurality of threads;
a second computer instruction to maintain an address tag array for each of said plurality of threads; and
a third computer instruction to maintain a data cache for each of said plurality of threads.

17. The computing apparatus of claim 7, wherein the cache management component, the internal interconnect, and the content addressable memory component comprise a network processor.

18. The computing apparatus of claim 17, further comprising:
a third memory store, coupled with the internal interconnect via an interface controller, wherein the interface controller is configured to receive memory access requests.

19. The computing apparatus of claim 18, wherein the interface controller comprises a front side bus interface controller integrated on the network processor.

20. The computing apparatus of claim 19, wherein the network processor further comprises a general-purpose processor component configured to store data on the second memory store.

21. The computing apparatus of claim 7, further comprising:
a fourth interface coupled between the first memory controller and the cache management component to transmit memory access requests.

22. A network processor, comprising:
an internal interconnect;
a first memory controller coupled with the internal interconnect to access a first off-chip memory store;
a second memory controller coupled with the internal interconnect to access a second off-chip memory store;
a first portion of the first off-chip memory store configured as a memory cache for the second off-chip memory store;
a cache management component coupled with the internal interconnect to retrieve data in the memory cache;
a content addressable memory component to perform content based searching of the first and second off-chip memory stores; and
a front side bus controller coupled with the internal interconnect to receive memory requests.

23. The network processor of claim 22, wherein the first off-chip memory store comprises static random access memory (SRAM).

24. The network processor of claim 22, wherein the second off-chip memory store is selected from a group of memory stores consisting of dynamic random access memory (DRAM), Rambus dynamic random access memory (RDRAM), static random access memory (SRAM), reduced latency dynamic random access memory (RLDRAM), double data rate dynamic random access memory (DDR DRAM), double data rate two dynamic random access memory (DDR-2), double data rate three dynamic random access memory (DDR-3), and fast cycle dynamic random access memory (FCDRAM).

25. The network processor of claim 22, further comprising:
a third memory controller coupled with the internal interconnect to access a third off-chip memory store, wherein the cache management component is configured to manage the memory cache corresponding to a memory address space for the third memory store.

26. The network processor of claim 25, wherein the third off-chip memory store is accessed via an off-chip front side bus and the off-chip front side bus is coupled with the front side bus controller.

27. The network processor of claim 25, wherein the third off-chip memory store is selected from a group of memory stores consisting of dynamic random access memory (DRAM), Rambus dynamic random access memory (RDRAM), static random access memory (SRAM), reduced latency dynamic random access memory (RLDRAM), double data rate dynamic random access memory (DDR DRAM), double data rate two dynamic random access memory (DDR-2), double data rate three dynamic random access memory (DDR-3), and fast cycle dynamic random access memory (FCDRAM).

28. The network processor of claim 22, further comprising:
   a communication channel linking the first memory controller to the cache management component to transmit memory access requests.

29. The network processor of claim 22, wherein the cache management component is configured to maintain a hardware-based cache tag array.

30. The network processor of claim 22, wherein the cache management component is configured to manage a cache tag array in a second portion of the first off-chip memory store.

31. A system, comprising:
   a first memory store, with a first interface;
   a second memory store with a second interface; and
   a network processor comprising:
   an internal interconnect;
   a first memory controller coupled with the internal interconnect to access the first memory store;
   a second memory controller coupled with the internal interconnect to access the second memory store;
   a cache management component coupled with the internal interconnect to effectuate a memory cache in a portion of the first memory store corresponding to data in the second memory store;
   a content addressable memory component to perform content based searching of the first and second memory stores; and
   an interface controller coupled with the internal interconnect to receive memory requests via the second interface.

32. The system of claim 31, wherein the first and second memory stores are selected from a group of memory stores consisting of dynamic random access memory (DRAM), Rambus dynamic random access memory (RDRAM), static random access memory (SRAM), reduced latency dynamic random access memory (RLDRAM), double data rate dynamic random access memory (DDR DRAM), double data rate two dynamic random access memory (DDR-2), double data rate three dynamic random access memory (DDR-3), and fast cycle dynamic random access memory (FCDRAM).

33. The system of claim 31, further comprising:
   a third memory store coupled with a third interface, wherein the network processor further comprises an interface controller, coupled with the internal interconnect and further coupled with the third memory store via the third interface.

34. The system of claim 33, wherein the third memory store is selected from a group of memory stores consisting of dynamic random access memory (DRAM), Rambus dynamic random access memory (RDRAM), static random access memory (SRAM), reduced latency dynamic random access memory (RLDRAM), double data rate dynamic random access memory (DDR DRAM), double data rate two dynamic random access memory (DDR-2), double data rate three dynamic random access memory (DDR-3), and fast cycle dynamic random access memory (FCDRAM).

35. The system of claim 33, wherein the third interface comprises a front side bus interface, and the interface controller comprises a front side bus controller, wherein the cache management component and the front side bus controller are integrated.

36. The system of claim 31, wherein the cache management component is configured to maintain a hardware-based cache tag array.

* * * * *